Figure 1:
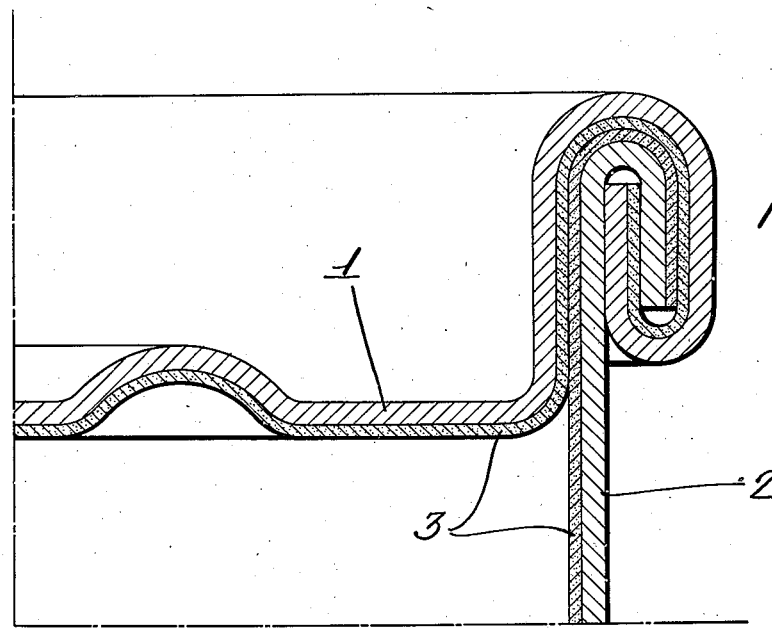

June 19, 1945. F. J. SODAY 2,378,446
COATED OBJECT AND PROCESS FOR MAKING THE SAME
Filed Oct. 16, 1941

INVENTOR.
Frank J Soday
BY
Hugo A. Kemman
Atty.

Patented June 19, 1945

2,378,446

UNITED STATES PATENT OFFICE 2,378,446

COATED OBJECT AND PROCESS FOR MAKING THE SAME

Frank J. Soday, Swarthmore, Pa., assignor to The United Gas Improvement Company, a corporation of Pennsylvania Application October 16, 1941, Serial No. 415,221

3 Claims. (Cl. 117—75)

This application is a continuation-in-part of my copending application Serial Number 219,557 filed July 16, 1938, now Patent No. 2,259,497, issued October 21, 1941, which pertains generally to the polymerization of unsaturated compounds and pertains particularly to the co-polymerization of such compounds.

The invention of said copending application pertains more particularly to co-polymerizing of benzene-soluble polymerized cyclopentadiene and unpolymerized ring-substituted methyl styrene of which para-methyl styrene is an example.

Cyclopentadiene may be polymerized into at least two broad types of polymers one of which is characterized by being soluble in solvents such as benzene, toluene, chloroform, carbon tetrachloride and high flash naphtha, while the other of which is characterized by being insoluble in these solvents. For convenience the former type of polycyclopentadiene will be referred to herein as soluble polycyclopentadiene.

A manner of obtaining soluble catalytically polymerized cyclopentadiene will be hereinafter described.

There are perhaps various sources of methyl styrene and particularly para-methyl styrene. Among these is the light oil obtained upon distillation of tar produced in the manufacture of carburetted water gas or oil gas. In addition, methyl styrene may be obtained from coal tar, drip oil, and from cracked petroleum products in general, as well as synthetically.

With ordinary methods of fractional distillation as now practiced, it is impossible to separate the methyl styrene and particularly para-methyl styrene from light oil in a substantially pure state because of the presence of other materials which apparently are either of similar boiling point or are capable of forming azeotropic mixtures with methyl styrene and particularly para-methyl styrene.

For instance, a typical para-methyl styrene fraction obtained by ordinary distillation processes from light oil will contain hardly more than 50% to 80% para-methyl styrene, and other fractions such as forerunnings and afterrunnings will contain substantially less para-methyl styrene.

Therefore, while pure methyl styrene, and particularly para-methyl styrene, diluted or not with a solvent, may be employed, the invention is especially useful in that it is also capable of utilizing methyl styrene fractions of various concentrations obtained from other sources such as by distillation from light oil, drip oil, coal tar, cracked petroleum products in general, and synthetic sources, and including relatively dilute methyl styrene fractions.

The following examples will serve to further illustrate the invention of said copending application.

Example 1

43.8 grams of a solution of polycyclopentadiene in toluene and containing 7.32 grams of polycyclopentadiene was mixed with 1.16 grams of a 54.0% solution of para-methyl styrene containing 0.63 gram of para-methyl styrene. The para-methyl styrene solution was a fraction obtained in the distillation of light oil from carburetted water gas tar.

The mixture was placed in a glass bomb and sealed in an atmosphere of nitrogen.

The bomb was then heated for 4 days at a temperature of 145° C.

44.23 grams of a solution containing 8.62 grams of the desired resin was thus obtained.

The yield obtained was somewhat above the theoretical which indicates that a portion of the solvent may have reacted and become a part of the resin molecule.

Example 2

36.2 grams of a solution of polycyclopentadiene in toluene and containing 6.04 grams of polycyclopentadiene was mixed with 8.73 grams of a 54.0% solution of para-methyl styrene containing 4.7 grams of para-methyl styrene. The para-methyl styrene solution was a fraction obtained in the distillation of light oil from carburetted water gas tar.

The mixture was placed in a glass bomb and sealed in an atmosphere of nitrogen.

The bomb was then heated for 10 days at a temperature of 100° C.

44.13 grams of a solution containing 8.78 grams of the desired resin was thus obtained.

Example 3

116.8 grams of an 11.25% solution of polycyclopentadiene in toluene and containing 13.14 grams of polycyclopentadiene were mixed with 2.9 grams of a 43.2% para-methyl styrene solution containing 1.54 grams of para-methyl styrene. The para-methyl styrene solution was a fraction obtained in the distillation of light oil from carburetted water gas tar.

The mixture was put in a glass bomb sealed in an atmosphere of nitrogen, and heated for 10 days at a temperature of 100° C.

119.7 grams of solution containing 14.22 grams of the desired polymer were obtained.

This solution, having a concentration of 11.88% was concentrated in vacuum to approximately 15%.

A tin coated strip of sheet metal was dipped in the above mentioned solution, air dried for 5 minutes, and baked for 15 minutes at a temperature of 190° C. A coating of 4.5 milligrams per square inch resulted. This metal strip was then dipped in a solution of "Vinylite" and baked for 15 minutes at a temperature of 150° C. A "Vinylite" coating of 5.68 milligrams per square inch resulted. The metal strip was then sterilized 15 minutes in a steam atmosphere with 11-12 pounds of steam pressure.

The resulting film was subjected to extremely severe tests for cohesion and adhesion and was found to be very satisfactory.

*Example 4*

116.8 grams of a solution of polycyclopentadiene in toluene and containing 13.14 grams of polycyclopentadiene were mixed with 2.9 grams of a 53.2% solution of para-methyl styrene containing 1.54 grams of para-methyl styrene. The methyl styrene solution was a fraction obtained in the distillation of light oil from carburetted water gas tar.

The mixture was placed in a glass bomb and sealed in an atmosphere of nitrogen.

The bomb was then heated for 10 days at a temperature of 100° C.

119.7 grams of a solution containing 14.22 grams of the desired resin was thus obtained.

While in the above specific examples toluene is used as a polymerization medium, it is to be understood that solvents in general may be employed of which benzene, xylene, ethyl benzene, solvent naphtha, petroleum naphtha, carbon tetrachloride, decalin, triethylbenzene and ethylene dichloride are examples.

Resin compounds prepared as illustrated in the above examples exhibit, among other things, outstanding properties as coating materials.

This invention pertains to the use of my new resinous products in liquid coating compositions, and to the coating of surfaces therewith, for example, surfaces of sheet metal to be made up into food containers such as those commonly known as "tin cans."

The term "food" is employed herein to mean that which is eaten or drunk or absorbed for nourishment or otherwise, and includes not only beverages such as beer, but also substances from which food is prepared, examples of which are coffee beans, whether ground or not, and tea leaves.

It is a well recognized fact that a tin coating for cans is in many instances unsatisfactory, even though the containers are hermetically sealed. In the case of grape juice for instance, tin is dissolved on long standing to degrade the product and should the smallest hole develop in the tin lining a reaction is set up which soon finds its way to the outer surface of the can, thus causing it to leak.

Other food stuffs are known to dissolve or react chemically or to be otherwise affected by the tin lining, for instance modified in taste, or odor and the art has long sought a solution for this difficult problem.

For example some foods develop hydrogen sulfide on standing. In the case of a tin coated can a reaction is set up whereby tin sulfide is formed. On the other hand, if the can is uncoated iron sulfide is formed.

It is the custom after a can has been sealed to subject it and its contents to a sterilization treatment with heat. This increased temperature greatly accelerates any reactions that are capable of taking place.

The introduction of the sealed can in the beverage trade has increased enormously the demand for a completely inert lining incapable of modifying the taste of the beverage. This applies particularly in the case of beer.

As a result of the foregoing the art has sought to find a lacquer which might be applied over or substituted for the tin coating. It was found, however, that lacquers taken generally either failed to form a suitable bond with the metal surface so as to adhere firmly thereto, or if a proper bond was formed they failed to resist reaction with foods.

This led to the adoption of a procedure whereby a lacquer having good bonding properties was used as a primer for a top coat comprising a second lacquer having proper food resisting properties. This in turn presented the further problem of finding two such lacquers which would bond properly with each other. The desired lacquer should, therefore, preferably have universal bonding properties.

Since it is desirable to apply the lacquer coating to the sheet metal before the can or other object or part is made up, the bonding properties of the lacquer must be such as to withstand bending, pressing, shaping, stamping, and so forth, without cracking or losing adhesion.

A common test is to subject a strip of coated sheet metal to considerable stretching during which the lacquer must not crack or lose adhesion, but must stretch with the metal while adhering firmly thereto.

Such test may be performed for instance by coating a tin panel, of any convenient dimensions such as 2 x 3 inches, on one surface with a solution of the resin in a suitable solvent. The quantity applied is conveniently such that the final film after baking will have a weight of from 9 to 11 milligrams per square inch. The temperature of baking is for convenience 140° C. After baking for one hour and cooling the coated tin panel is bent backwardly on itself over a mandrel $\frac{1}{32}$ inch in diameter through an angle of 180° with the coated surface outward. The ends are then bent back into the same plane. The film must be capable of repeatedly withstanding this manipulation without striation, loss of adhesion, surface cracking or checking or apparent optical change.

A considerably more severe test is to double cross hatch the film before or after bending in the manner described in the preceding paragraph. The cross hatching may be accomplished by using a sharp object such as a knife. An adhesive tape, such as that known commercially as Scotch cellulose tape, is then firmly applied to the surface and removed with a jerk. A film that withstands this test is perfect from the standpoint of cohesion and adhesion.

In addition to the foregoing the lacquer coating must also have an acceptable appearance, preferably suggesting utmost cleanliness. This is because the usual housewife looks with great disfavor upon any discoloration of the inside surface of a can when removing food therefrom.

In this connection many lacquers develop a cloudiness during the sterilization step generally referred to as blushing. The resulting discoloration is very undesirable.

Furthermore, the lacquer also should be completely odorless and tasteless in order not to impair the odor or flavor of the canned food product in any way.

Surface films having all of the above desirable properties may be produced by applying to surfaces in general, and metal surfaces such as tin and iron in particular, a liquid coating composition having as a base my new resin, and then baking or air drying the coating thus applied, or permitting it to dry in any other atmosphere and/or other manner.

For example, films prepared by applying to tin plate a solution of my new resin in a suitable solvent, for instance, toluene, followed by baking for a period of one hour at 140° C. show excellent coherence and adherence even after repeated bending over a mandrel $\frac{3}{32}$ inch in diameter, and the application of the cross hatching-adhesive tape test.

These films also show excellent alkali and water resistance, do not become brittle with age and are relatively highly resistant to abrasion Examples of the application of my new resin to the coating of surfaces are as follows:

Example 5

A 15% solution of my new resin in toluene is applied to tin plate or to a tin plated fabricated object or other surface, such as of glass, iron, steel, zinc, copper, aluminum, stainless steel, nickel, chromium, lead, magnesium, or alloys containing one or more of these metals, etc., in such quantities that the final resin film, whether applied in one coat or several coats with or without intermediate drying, will have a desired thickness such as from 9 to 11 milligrams per square inch of dry resin.

Since drying is usually hastened by baking, the coated object after suitable evaporation of solvent is placed in an oven and heated to a suitable temperature such as between 50° C. and 250° C for a sufficient period to insure satisfactory drying. However, if desired the coated object may be dried without the application of heat, or in any other manner.

A suitable baking time is found to be between 15 minutes and 60 minutes.

Sheet metal thus coated is ready for the manufacture of objects such as cans or other containers, bottle caps, screw caps, and in fact objects of any character. It will withstand the roughest treatment such as sharp bending, stamping, stretching, and so forth without cracking, loosening, or other injury to the coating.

This embodiment of my invention is illustrated in Figure 1 of the accompanying drawing which is a somewhat diagrammatic sectional view of a portion of a "tin can". The can end 1 coated with a dried film 3 of my new resin is joined by means of the usual can seaming operation to the can side 2 carrying a dried film 3 of my new resin.

My new liquid coating composition may also be applied to wood, paper, cardboard, fibre board, composition board, asbestos sheets, stoneware, ceramic ware, brick, cement, concrete, etc.

The use of my new resin is by no means restricted to the formation of a single film system.

For instance, it may be used as a primer coat for another resinous coating compound of lesser bonding qualities, for example the polymerized vinyl compounds as shown by the following example. On the other hand, it may be used as a top coat over a primer coat formed from some other coating composition or materials.

Example 6

A tin plated sheet or other suitable metal sheet or fabricated object is coated with a solution of my new resin in a suitable solvent, say toluene, in sufficient quantities to secure a desired final coating weight after drying, say of approximately 5 milligrams per square inch.

To hasten drying, the coated sheet is placed in an oven and baked at a temperature of say between 50° C. and 250° C. for from 15 minutes to 60 minutes. Drying may be accomplished in any other manner.

A suitable coat or series of coats of polymerized vinyl compound may then be applied followed by drying such as by baking, or otherwise.

A suitable final coat is of such thickness that the combined film, that is the film of my new resin and the film of polymerized vinyl compound, has a total thickness equivalent to from 8 to 11 milligrams per square inch.

Polymerized vinyl compounds are well known in the art. For instance, a typical polymerized vinyl compound is made by polymerizing a solution containing 85% vinyl chloride and 15% vinyl acetate on the undiluted basis using benzoyl peroxide as catalyst with mild heat.

Figure 2:
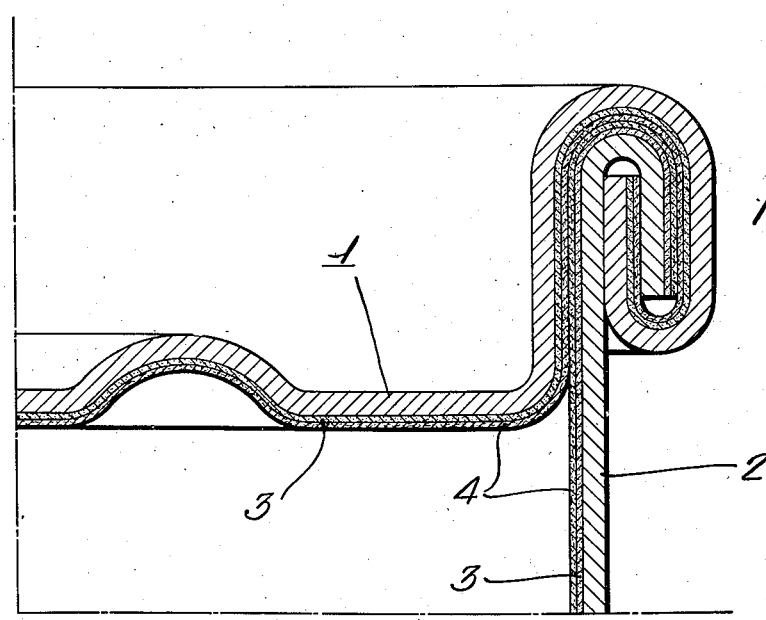

This embodiment of my invention is illustrated in Figure 2 of the drawing which represents a somewhat diagrammatic sectional view of a portion of a "tin can." The can end 1 coated with a primer coat 3 of my new resin and a top coat 4 of a synthetic resin such as "Vinylite" is joined by means of the usual can seaming operation to the can side 2 coated with a dual film system of a primer coat 3 of my new resin and a top coat 4 of synthetic resin, such as "Vinylite."

While the film thicknesses given are found to be suitable for the purpose, and particularly for food containers, other film thicknesses may obviously be employed without departing from the spirit of the invention.

With respect to the temperature and time of baking, I usually prefer not to exceed about 400° F. and at such temperatures a baking time not longer than about 15 minutes to avoid any possible injury to the film. Thus, although my resin films may be safely subjected to higher temperatures during baking, in general, I find temperatures up to 350° F. and baking times up to 30 minutes very satisfactory. With higher temperatures the baking time may be correspondingly shortened to yield similar satisfactory results.

While I refer to "baking" broadly and to "heating in the presence of air" or an "oxygen-containing gas" as a means of drying my coating or film, it is to be understood that the taking on of oxygen by the film need not necessarily take place simultaneously with the heating or baking. On the contrary, I may obtain excellent results by heating or baking the coating or the coated object in an inert atmosphere as of nitrogen, carbon dioxide, or the like followed by exposure to the atmosphere or other oxygen-containing medium.

Additional drying or hardening of the film may result from the absorption of oxygen.

Similarly, in preparing my multiple-film systems and particularly a system including my resin film and a "Vinylite" film, the drying or hardening of my resin film may be secured (a) by baking or heating in an oxygen-containing atmosphere, or (b) baking my resin film in an inert atmosphere but permitting it to stand or "season" in contact with an oxygen-containing atmosphere for a period of time (for example a week) before applying the top coating of "Vinylite," or (c) baking or heating my resin film in an inert atmosphere, coating the baked film with the top coating of "Vinylite" and then letting the dual film stand or "season" in contact with an oxygen-containing atmosphere such as before using the coated article for its intended purpose, (in the last-named case, oxygen may penetrate or seep through the top resin film to my resin primer coat), or (d) applying and heating my resin film in an inert atmosphere, coating with a top coat of another resin film, such as "Vinylite," still in an inert atmosphere, and having the multiple-film system thus formed, still in an inert atmosphere, or (e) any combination of any of the foregoing, or otherwise.

My resin films may be satisfactorily hardened either by heat, or by an oxygen-containing environment or by a combination of both.

In fact, other drying or hardening methods may be employed.

As an illustration, my films may be dried or hardened by a vulcanization-like treatment, such as is accomplished by adding a vulcanization agent to the solution at the time of its application, or applying the vulcanization agent over the film after its application, or enclosing the applied film in an atmosphere of vulcanizing gas, such as $H_2S$, or any combination of the foregoing, or otherwise. The application of heat hastens the drying or hardening action.

For examples, a solution of my resin may contain dissolved $H_2S$, and after its application to the metal surface, the film may be dried in an atmosphere of $H_2S$ with the application of heat. A baking temperature of 350° F. and a baking time of 15 minutes is illustrative.

Vulcanized films may not be oxygen-containing, and may or may not be capable of taking up oxygen, if exposed to the atmosphere or other oxygen-containing gas, say at a greatly reduced rate.

Similar drying procedure may be applied to the vinyl top coat, if desired.

After drying or hardening my films are, generally speaking, insoluble.

While the film thicknesses given are found to be extremely suitable for the purpose, and particularly for food containers, other film thicknesses may obviously be employed without departing from the spirit of the invention.

While the foregoing particular description has been concerned primarily with the application of the protective film or films to metal sheets of a gauge used in the manufacture of "tin" cans, it will be obvious that my invention is not limited thereto but may be applied to any metal sheet material, and in fact, to metallic objects in general whether pre-fabricated or not, where a tough strongly adhering film or film system is desired.

Thus, the resin film may be applied to metal foil.

As an illustration, tin foil and aluminum foil, each of which is used to package dairy products like butter and cheese, may be so coated. If desired, these materials in molten form may be poured into molds lined with foil coated in accordance with my invention.

So too, lead foil, such as is used to package tea leaves, may be coated in accordance with my invention.

Metal foil may be coated by any desired procedure. For example, the foil may be passed through a solution of the coating material and the excess removed by means of doctor blades or rolls. Or a conventional roll type coating procedure may be employed and the solvent removed and/or recovered in a drying tower.

If desired, metal foil may be strengthened by backing it with paper, or by laminating two or more foil layers. For example, a sheet of metal foil may be coated on one side and the coated side pressed into contact with a sheet of paper or second sheet of foil before the coating material has completely dried. This may be followed by coating the opposite side of the metal foil and drying the film for contact with foodstuffs. On the other hand, metal foil coated with my dual film system with "Vinylite" as the top coat may be hot pressed against paper or foil to effect union of the materials.

While the invention has been more particularly described in connection with the coating of sheet metal including foil in the flat, my resin film or film system may be applied during or after any forming operations for converting the initial material into the finished object. It is generally useful for coating metallic objects in general, whether fabricated from sheet metal or not, or whether pre-fabricated in whole or in part prior to application of the film or film system.

Since in the food packaging field the important consideration is that the resin in contact with the food be chemically inert, insoluble in the foodstuff, incapable of imparting odor and taste thereto, and strongly adherent to the enclosing wall, outside portions of the container or foil may be left uncoated, or may be coated with other materials, particularly if suitable, or with my materials with or without additives, or otherwise.

The following is an example of a varnish made with my new resin.

*Example 7*

The materials employed and quantities of the same are as follows:

| | Parts |
|---|---|
| Paramethyl styrene - polycyclopentadiene resin | 100 |
| China-wood oil | 160 |
| Bodied linseed oil | 40 |
| Mineral spirits | 300 |

The China-wood oil is heated to 350° F. as rapidly as possible, and then heated from 350° F. to 565° F. during a period of 25 minutes. The bodied linseed oil and the paramethyl styrene-polycyclopentadiene resin are added at this point with agitation and the varnish is then chilled to 400° F. The varnish is then reduced by the addition of the mineral spirits.

While any proportion of soluble polycyclopentadiene to methyl styrene may be employed in making my new resin, I prefer, in the case of coating compositions, to employ between 50% and 99% soluble polycyclopentadiene to 1% to 50% monomeric methyl styrene on the undiluted basis. Films made with resins resulting from these proportions are relatively insoluble after drying. 85% to 95% polycyclopentadiene to 5% to 15% monomeric methyl styrene is very suitable.

On the other hand, in the case of casting or molding compositions, I prefer to employ between 50% and 99% monomeric methyl styrene to between 1% to 50% soluble polycyclopentadiene on the undiluted basis. 85% to 95% monomeric methyl styrene to 5% to 15% soluble polycyclopentadiene is very suitable.

The resin obtained by polymerizing a mixture containing 90 parts of soluble polycyclopentadiene to 10 parts of monomeric methyl styrene is excellent for coating purposes.

The above test for cohesion and adhesion of the applied film to metal surfaces increases in severity with increase in thickness of the film.

A film on tin plate formed with resin obtained upon the polymerization of a solution containing 90 parts of soluble polycyclopentadiene to 10 parts of monomeric para-methyl styrene for 4 days at a temperature of 145° C. showed excellent cohesion and adhesion even when the coating weight was increased to 14 milligrams per square inch.

Another film on tin plate formed with resin obtained by polymerizing a solution containing 90 parts of soluble polycyclopentadiene to 10 parts of monomeric para-methyl styrene for 10 days at 100° C. showed excellent cohesion and adhesion even though the film thickness was increased to 21 milligrams per square inch.

While polymerization may be carried out at any suitable temperature, I find temperatures between 50° C. and 250° C. satisfactory and prefer to employ temperatures between 75° C. and 200° C.

On the other hand, a catalyst comprising a metallic halide such as tin chloride, zinc chloride, boron trichloride, ferric chloride, aluminum chloride, and boron trifluoride, a metallic halide organic solvent complex, such as AlCl₃ organic solvent complex, aluminum bromide organic solvent complex, zinc chloride organic solvent complex, boron trifluoride organic solvent complex, boron chloride organic solvent complex, or an organic peroxide such as pinene peroxide or benzoyl peroxide, or activated clay, activated carbon, activated alumina, silica gel, diatomaceous earth, ultra sonics and/or ultra violet light might be substituted for or combined with heat for carrying out the polymerization.

I prefer to carry out the polymerization in the presence of an inert gas such as carbon dioxide or nitrogen or in the presence of solvent vapors or in a vacuum to avoid the formation of insoluble gels which are more readily formed in the presence of oxygen. In general, the exclusion of oxygen from the material during and after the polymerizing process will prevent the formation of insoluble compounds.

While I prefer to utilize these resinous materials in the form of solutions because of their pronounced tendency to form insoluble polymers upon exposure to air for any length of time, I wish to point out that the solvent can be removed from these resins by careful distillation either with or without a reduction in pressure. Such distillation, however, is preferably carried out in an inert atmosphere.

The addition of certain anti-oxidants to solutions of the resin, such as dipentene, pyrogallol, hydroquinone, p-tertiary butyl catechol and 2-4 diamino phenol dihydrochloride will prevent the formation of insoluble materials apparently indefinitely as well as improve films prepared from the resins. The mechanism involved is apparently a regulation of the amount of oxygen absorbed by the film during the drying and baking process.

Other suitable inhibitors are certain secondary amines. These secondary amines may be represented by the following general formula

in which R₁ is a substituted or unsubstituted aryl, aralkyl, cycloparaffinic, cycloolefinic, hydroaromatic, or naphthenic ring or group, and in which R is a substituted or an unsubstituted aryl, aryl-alkyl, alkyl-aryl, alkyl, cycloparaffinic, cycloolefinic, hydroaromatic, or naphthenic ring or group. Included are secondary amines such as for example

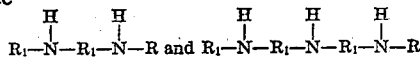

where R and R₁ have the same meaning as before.

Secondary amines containing one or more aryl or substituted aryl groups are preferred.

Examples of secondary amines which are particularly satisfactory are diphenyl-p-phenylene diamine, phenyl beta naphthylamine, isopropoxy-diphenylamine, aldol alpha naphthylamine (and polymers thereof), symmetrical di beta naphthyl-para-phenylenediamine, trimethyl-dihydroquinoline (and polymers thereof), and the ditolyl-amines.

Mixtures of certain of these secondary amines also may be used for this purpose. Included among the mixtures are the commercial products known as "Age-Rite Exel," which is a mixture of isopropoxydiphenylamine and diphenyl-p-phenylene diamine, "Age-Rite-Hipar," which is a mixture of phenyl beta naphthylamine, isopropoxydiphenylamine, and diphenyl-p-phenylene diamine, and "Age-Rite HP," which is a mixture of phenyl beta napthylamine and diphenyl-p-phenylene diamine.

While my new resin is ideally suited to the coating of surfaces in general and particularly to the coating of metal surfaces such as those of food containers as referred to above, it may be used for many other purposes for instance, for lacquers generally, for varnishes either alone or in admixture with other resins, for enamels, for paints, or in fact for coating compositions generally. It is also well suited for casting and molding purposes, either alone or in admixture with other plastics or resins. Fillers may be added if desired. Suitable fillers are wood flour, cotton linters, asbestos, mica, leather findings, cloth scraps, canvas scraps, clay and the like. Since my new resin is quick-setting it may have use as a drier.

A method for producing soluble catalytically polymerized cyclopentadiene is described in the following example which is taken from my copending application Serial No. 204,786, filed April 28, 1938, now Patent 2,314,904, dated March 30, 1943. It is to be understood, however, that soluble polycyclopentadiene obtained in any other way might be substituted.

*Example 8*

0.30 cubic centimeters of aluminum chloride-diethyl ether complex are added to 60 grams of toluene with thorough agitation to form a suspension, emulsion or solution.

A mixture of 20 grams of cyclopentadiene and 20 grams of toluene are added to the suspension during the course of 12 minutes, the temperature ranging from 26-49° C. during the addition. The mixture is then agitated for an additional hour, after which 1 cubic centimeter of water is added. This is followed by agitation for 15 minutes.

10 grams of quicklime (CaO) are now added to the reaction mixture followed by agitation for an additional hour.

5 grams of a suitable filter aid are then added, and the mixture filtered.

A filtered solution containing 16.4 grams of polycyclopentadiene is thus obtained.

Generally speaking, any other aluminum chloride-organic solvent complex might be substituted. Examples of these are aluminum chloride-benzene complex, aluminum chloride-toluene complex, aluminum chloride-pentene complex, aluminum chloride-decene complex, aluminum chloride-phenyl methyl ether complex, aluminum chloride-phenyl ethyl ether complex, aluminum chloride-diisopropyl ether complex, aluminum chloride-isobutene complex, aluminum chloride-ethylene complex, aluminum chloride-nitrobenzene complex, aluminum chloride-acetone complex, and aluminum chloride-benzoyl chloride complex.

In Example 8 it will be noted that both the cyclopentadiene and the catalyst are in diluted form before addition. Furthermore, diluted cyclopentadiene is preferably added to diluted cataylst rather than vice versa to afford a better control of the speed and uniformity of the reaction and of the amount of heat evolved and consequently the type of polymer produced. The reaction runs smoother and is much more easily controlled on a large scale.

The addition of water to hydrolyze the catalyst makes it possible not only to completely remove the activity of the catalyst and thus stop the reaction at any point, but also makes it possible to remove the corrosive and discoloring acid constituents of the catalyst by a suitable alkali. The alkali is preferably added with the water used to hydrolyze the catalyst, although it may be added later if desired. The failure to substantially completely remove the catalyst and its hydrolysis products may be the cause of serious discoloration. The insoluble reaction products formed during the hydrolysis and neutralization remain behind on the filter leaving a highly purified filtrate.

The soluble catalytically polymerized cyclopentadiene may be used as such, or it may be concentrated in a vacuum still of suitable design to give a product containing any desired higher concentration of polycyclopentadiene including solid polycyclopentadiene, or it might be diluted to give any desired lower concentration, or a second solvent might be substituted such as a higher boiling solvent. This may be done either before or after concentration by adding the second solvent and distilling.

In Example 8 the particular temperatures were chosen to control the physical properties such as viscosity and color of the product. It will be noted that at no time did the temperature exceed 100° C. or even 70° C. The manner of combining the reactants, constant agitation, and brine cooling made it possible to prevent local overheating, and the formation of insoluble polymer.

In Example 8 (1) temperature, (2) concentration of cyclopentadiene, (3) proportion of uniformly distributed catalyst, and (4) reaction time may be varied considerably in the production of soluble polymer. If it is found that insoluble polymer is obtained, one or more of the four conditions, namely (1) temperature, (2) concentration of cyclopentadiene (3) proportion of catalyst, and (4) reaction time should be reduced until the soluble polymer is obtained.

Carrying out the polymerization in the presence of a solvent makes it possible to have any desired concentration of cyclopentadiene.

While in Example 8 no dilution of the product was required to facilitate hydrolysis and/or filtering, it is to be understood that dilution with a solvent may be employed, if desired, particularly in the case of highly viscous products.

Generally speaking, for the formation of soluble catalytically polymerized cyclopentadiene to the exclusion of insoluble polymer and of extreme discoloration, temperatures should rarely exceed 100° C., and preferably should not exceed 70° C., concentrations of cyclopentadiene should rarely exceed 50% by weight of the total solution except possibly at low temperatures, and concentrations of uniformly distributed catalyst should rarely exceed 25% by weight of cyclopentadiene although these values are not to be considered as fixed limits. By having extremely low values for one or two of the items mentioned the third might possibly exceed the value given. Should a short reaction time be employed, that is, a reaction time substantially less than one hour, all three items might possibly be higher, but perhaps with a sacrifice in yield and color.

It should be kept in mind that there are for practical purposes minimum values for temperature, concentration of cyclopentadiene, proportion of catalyst and time, which practice will show ought to be exceeded to obtain reasonable yields. For instance, I find that when using ordinary commercial toluene as the solvent at least 1.0 gram of aluminum chloride-ether complex per 100 grams cyclopentadiene is usually required. On the other hand, if the maximum values given in the previous paragraph for temperature, catalyst and cyclopentadiene were used simultaneously, insoluble polymer would be formed, even though the reaction time chosen were as short as good practice would permit.

It is by the observance of the preferred principles set forth herein that a quality soluble catalytically polymerized cyclopentadiene is produced in good yield.

While in Example 8 toluene is used as a polymerization medium, it is to be understood that any other suitable solvent may be substituted of which benzene, xylene, ethyl benzene, solvent naphtha, petroleum naphtha, carbon tetrachloride, decalin, triethylbenzene and ethylene dichloride are especially suitable. The products with benzene and toluene are preferred for specific uses. Products with tetralin and pentene-2 are also very good.

While the use of pure cyclopentadiene in solution in a suitable solvent or cyclopentadiene admixed with some methyl cyclopentadiene in solution in a suitable solvent simplifies the system from the standpoint of the number of components present, solutions of crude cyclopentadiene in various states of purity might be used with various degrees of success depending upon the results desired.

Examples of crude cyclopentadiene are the cyclopentadiene fractions obtained in the distillation of tar, drip oil and medium and low temperature condensates resulting from subjecting manufactured city gas such as carburetted water gas, oil gas, or coal gas to refrigeration.

While a particular method of obtaining soluble polycyclopentadiene has been specifically set forth, it is to be understood that soluble polycyclopentadiene obtained from any other source may be employed without departing from the invention.

Although in the examples given a dilute solution of polycyclopentadiene is used in the preparation of my new resin, it is to be understood that any desired concentration may be employed including highly concentrated solutions as well as solid polycyclopentadiene.

Likewise, monomeric methyl styrene from any other source than light oil such as drip oil, coal tar, cracked petroleum products, and synthetic sources, may be employed without departing from the invention. Such methyl styrene may be in any concentration up to and including 100%, though the polymerization of methyl styrene with polycyclopentadiene is usually carried on in the presence of a common solvent which acts as a diluent.

When light oil is the source of methyl styrene an excellent methyl styrene fraction composed largely of para-methyl and meta-methyl styrenes is obtained when at least approximately 80% to 95% of the material boils between 167° C. and 175° C.

The term "methyl styrene" as employed throughout the specification and in the claims, unless otherwise qualified, refers to any one or more of the ring-substituted methyl styrenes namely ortho, meta and para methyl styrenes.

For the purpose of convenience in the claims, solubility characteristics will be defined by the term "benzene-soluble," though it is to be understood that the actual presence or absence of benzene in the solution or in the applied films is not implied.

It is to be understood that the above specific examples are by way of illustration and that changes, omissions, additions, substitutions, and/or modifications might be made within the scope of the claims without departing from the spirit of the invention.

I claim:

1. A formed film-coated article shaped by deformation of a film-coated metallic body, said formed film adhering strongly to the formed metal and comprising a primer coat of relatively insoluble dried copolymer of methyl styrene and benzene-soluble resinous polycyclopentadiene, and a top coat of a polymerized vinyl compound.

2. A film coated metal article of which the film coating comprises a primer coat of relatively insoluble dried copolymer of methyl styrene and benzene-soluble resinous polycyclopentadiene, and a top coat of a polymerized vinyl compound.

3. A process for producing a formed metallic article coated with a formed protective layer of synthetic resin which comprises coating metallic sheeting from which the article is to be formed with a copolymer of from 1% to 50% by weight of methyl styrene on the undiluted basis and from 50% to 99% by weight on the undiluted basis of benzene-soluble resinous polycyclopentadiene, drying said coating, applying over said first mentioned coating a second coating of a polymerized vinyl compound, drying said second mentioned coating, and subjecting the coated sheeting to shaping operations to produce a formed article.

FRANK J. SODAY.